United States Patent [19]

Nakayama et al.

[11] 4,221,655
[45] Sep. 9, 1980

[54] AIR CLASSIFIER

[75] Inventors: Niro Nakayama, Nara; Kazuhiro Yonezawa, Habikino, both of Japan

[73] Assignee: Nippon Pneumatic Manufacturing Co., Ltd., Osaka, Japan

[21] Appl. No.: 16,613

[22] Filed: Mar. 1, 1979

[30] Foreign Application Priority Data

Mar. 3, 1978 [JP] Japan .......................... 53-28958[U]
Jul. 6, 1978 [JP] Japan .......................... 53-94866[U]

[51] Int. Cl.² .............................................. B04C 5/08
[52] U.S. Cl. ................................. 209/211; 55/261; 55/459 R
[58] Field of Search ............... 209/144, 154; 55/261, 55/394, 459 R

[56] References Cited

U.S. PATENT DOCUMENTS

| 2,339,568 | 1/1944 | Hobbie ................................ 209/144 |
| 2,922,520 | 1/1960 | Gustavsson et al. ............... 209/144 |
| 3,306,443 | 2/1967 | Sereno et al. ....................... 209/154 |
| 3,985,526 | 10/1976 | Phillippi ............................ 209/144 |

FOREIGN PATENT DOCUMENTS 2142196 1/1973 France ..................................... 209/144

Primary Examiner—Ralph J. Hill
Attorney, Agent, or Firm—Wenderoth, Lind & Ponack

[57] ABSTRACT

An air classifier having a ring-shaped high-pressure air chamber disposed around a classifying chamber and communicating therewith by means of a plurality of small openings, such as air injection nozzles or a louver, these openings face in the direction of movement of material entering the classifying chamber and traveling in a vortex so that the material is accelerated by the air which is injected into the classifying chamber through the small openings.

7 Claims, 7 Drawing Figures

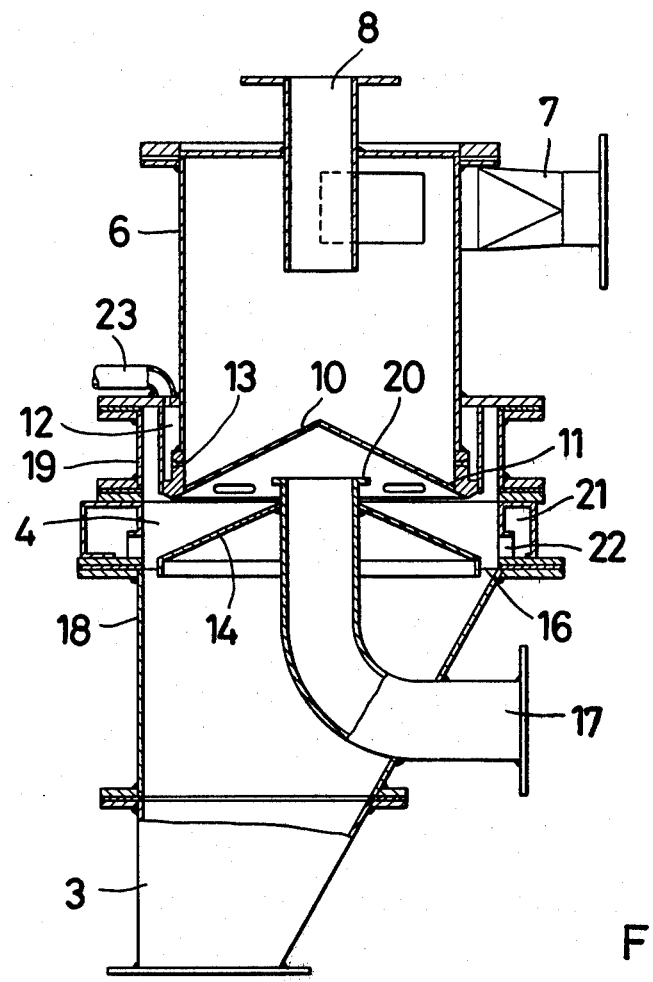
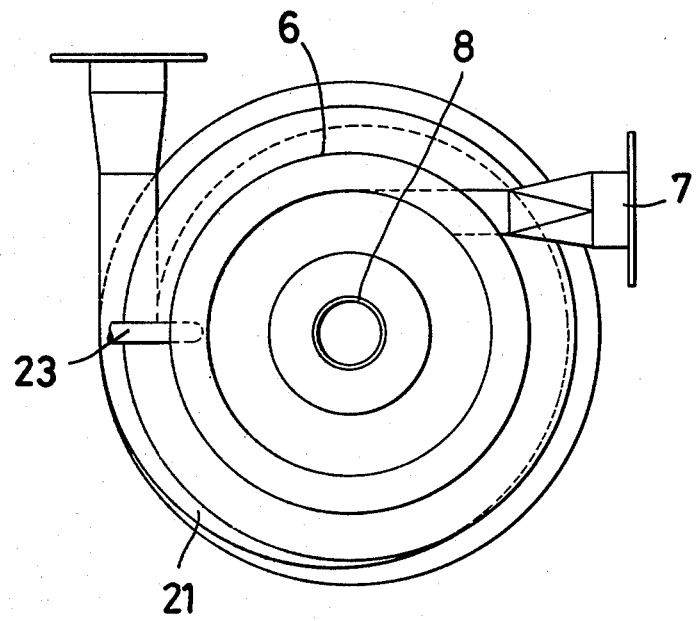

AIR CLASSIFIER

The present invention relates to an air classifier and particularly to an apparatus for classifying powdery material into fine particles and coarse particles by means of air currents.

It has been a common practice to inject high-pressure air into the classifying chamber of an air classifier in an upward direction from the bottom of the classifying chamber to accelerate the material and thereby create a vortex motion therein. Consequently, because the opening for discharging coarse particles from within the classifying chamber is located just under the openings for injecting high-pressure air into the classifying chamber, coarse particles are frequently kept in suspension above the discharge opening. The smooth flow of coarse particles toward the discharge opening is hindered all the more because the conventional air classifier relies solely on gravity for discharging coarse particles from the classifying chamber.

Another disadvantage of the conventional air classifier is that, because of the necessity of injecting a large quantity of air into the classifying chamber, the concentration of particles in the classifying chamber is kept low and uneven and consequently a large quantity of material cannot be processed per unit time.

Still another disadvantage of the conventional air classifier is that only large-sized particles are separated from fine ones because the particles moving in a vortex in the classifying chamber have a large centripetal component of velocity.

It is an object of the present invention to eliminate and solve the above-described disadvantages.

It is an object of the present invention to provide an air classifier capable of keeping a high and even concentration of particles in the classifying chamber so that powdery material may be efficiently classified therein and large quantities of material may be processed per unit time.

It is another object of the present invention to provide an air classifier which permits extremely fine particles to be separated within the classifying chamber.

With these objects in view and as will become apparent from the following detailed description, the present invention will be more clearly understood in connection with the accompanying drawings, in which:

FIG. 3 is a vertical sectional view of the second embodiment in accordance with the present invention;

FIG. 4 is a plan view thereof;

In the drawings, like numerals are employed to designate like parts throughout the various views.

Figure 1:
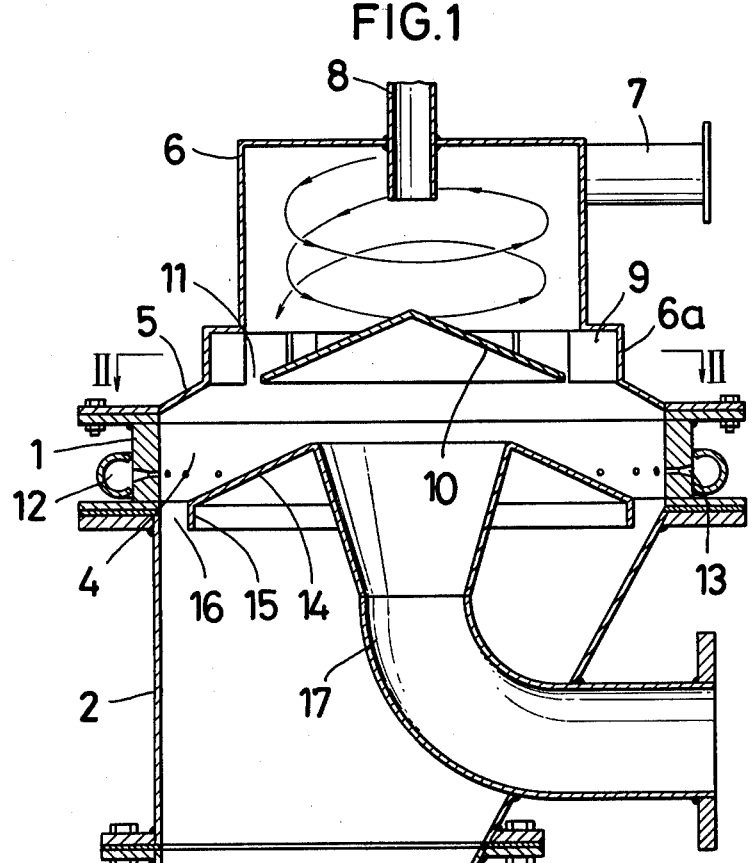
FIG. 1 is a vertical sectional view of the first embodiment in accordance with the present invention.

Referring now to FIG. 1, an air classifier includes a main casing 1, a lower casing 2 which is connected to the lower part of the main casing 1, and a hopper 3 connected to the lower end of the lower casing 2. The interior of the main casing 1 is divided into a classifying chamber 4, the top of which is covered with an upper covering 5 which is mounted on top of the main casing 1. A guide barrel 6 is vertically positioned in the central part of the top of the upper covering 5. A feed pipe 7 is connected at a tangent to the upper part of the cylindrical side wall of the guide barrel 6. An exhaust pipe 8 is provided on top of the guide barrel 6.

A plurality of guide vanes 9 are fixed to the internal surface of the cylindrical wall of a large-diameter portion 6a provided in the lower part of the guide barrel 6, and a conical guide plate 10 is mounted coaxially within the lower part of the guide barrel 6 to define a ring-shaped supply opening 11 located between the guide vanes 9 and the circular edge of the conical guide plate 10.

Figure 2:
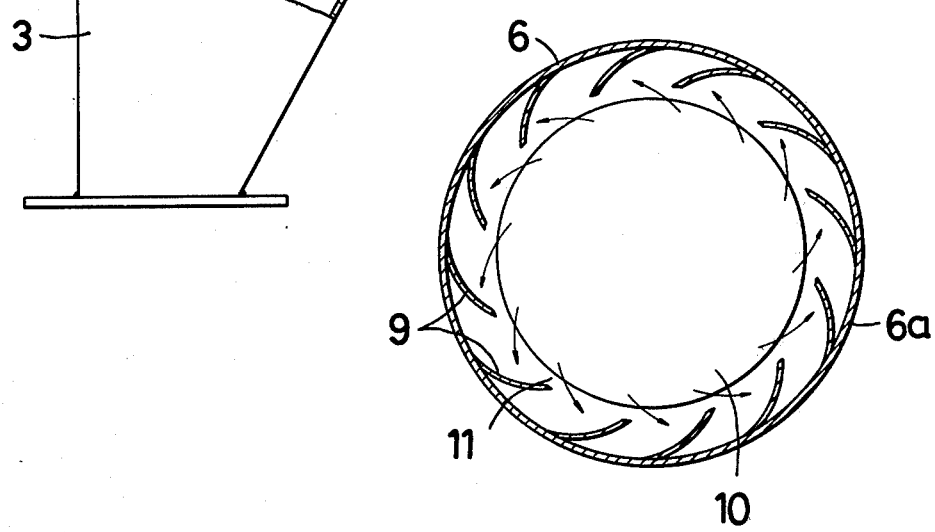
FIG. 2 is a sectional view taken along line II—II of FIG. 1.

Referring now to FIG. 2, each of the guide vanes 9 is slightly curved so that its end portion is substantially at a right angle to the direction of travel of the material which is moving in a vortex in the large-diameter portion 6a of the guide barrel 6. Consequently, when the material collides with the guide vanes 9, constituents of the material are dispersed.

The large-diameter portion 6a may be omitted and the guide vanes 9 may be fixed directly to the internal surface of the guide barrel 6 in its lower part. Furthermore, the guide barrel 6 may be tapered inward toward its lower end so that the velocity of the material moving in a vortex therein does not decrease as the material moves toward the lower end thereof.

Referring now again to FIG. 1, a ring-shaped high-pressure air chamber 12 which is located around the main casing 1 communicates with the classifying chamber 4 by means of a plurality of air injection nozzles 13 which face in the direction of travel of the material which is entering the classifying chamber 4 through the supply opening 11 and moving in a vortex, so that the material is accelerated by the air which is injected into the classifying chamber 4 through the air injection nozzles 13.

A classifying plate 14 which is a truncated cone is provided at the bottom of the classifying chamber 4, and a downwardly extending sleeve 15 is provided on the lower edge of the classifying plate 14 to define a ring-shaped discharge opening 16 for discharging coarse particles between the downward sleeve 15 and the side wall forming the boundary between the classifying chamber 4 and the lower casing 2. On the other hand, one end of a discharge pipe 17 for discharging fine particles is connected to the upper edge of the classifying plate 14. The discharge pipe 17 is bent within the lower casing 2 so that the other end of the discharge pipe 17 projects through the side wall of the lower casing 2.

Referring now to FIG. 3, an air classifier in accordance with the second embodiment includes a casing 18, a hopper 3 which is connected to the lower end of the casing 18, a classifying chamber 4 located on top of the casing 18, and a supporting barrel 19 provided on top of the classifying chamber 4.

A classifying plate 14 which is a truncated cone is provided at the bottom of the classifying chamber 4, and a ring-shaped discharge opening 16 for discharging coarse particles is located around the lower edge of the classifying plate 14. On the other hand, a discharge pipe 17 for discharging fine particles is attached to the upper edge of the classifying plate 14 in such a manner that the upper end portion of the discharge pipe 17 projects slightly upward into the classifying chamber 4, the upper edge of the discharge pipe 17 having an outwardly extending flange 20. The discharge pipe 17 is bent within the casing 18 so that the other end of the discharge pipe 17 projects through the side wall of the casing 18.

A vortex chamber 21 is provided on the outside of the classifying chamber 4 and has a sectional area which gradually decreases toward its terminal portion as shown in FIG. 4. The cylindrical side wall of the classifying chamber 4, i.e., the partition wall provided between the vortex chamber 21 and the classifying chamber 4, has a louver therein in which a plurality of slanted fins 22 are located in such a manner that they permit high-pressure air to be supplied from the vortex chamber 21 to the classifying chamber 4 in substantially the same direction as the path of travel of the material moving in a vortex in the classifying chamber 4.

A guide barrel 6 is vertically positioned on top of the supporting barrel 19, with the lower end portion of the guide barrel 6 resting in the supporting barrel 19. A feed pipe 7 is connected at a tangent to the upper part of the cylindrical side wall of the guide barrel 6.

An exhaust pipe 8 is provided on top of the guide barrel 6, while a conical guide plate 10 is supported coaxially within the guide barrel 6 in the lower part thereof by means of radial ribs extending from the vertex of the conical guide plate 10 to the lower edge of the guide barrel 6. Consequently a ring-shaped supply opening 11 is formed around the circular edge of the conical guide plate 10.

A ring-shaped high-pressure air chamber 12 is located on the outer surface of the lower part of the guide barrel 6 communicates with the interior of the guide barrel 6 by means of a plurality of air injection nozzles 13 which are provided at regular intervals there around. The air injection nozzles 13 are facing in the same direction as the path of travel of the material which is moving in a vortex upon entry of the material into the guide barrel 6 so that the material is accelerated and the constituents thereof are efficiently dispersed by the high-pressure air which is injected into the guide barrel 6 through the air injection nozzles 13. The air chamber 12 is supplied with high-pressure air through an air pipe 23.

Figure 5:
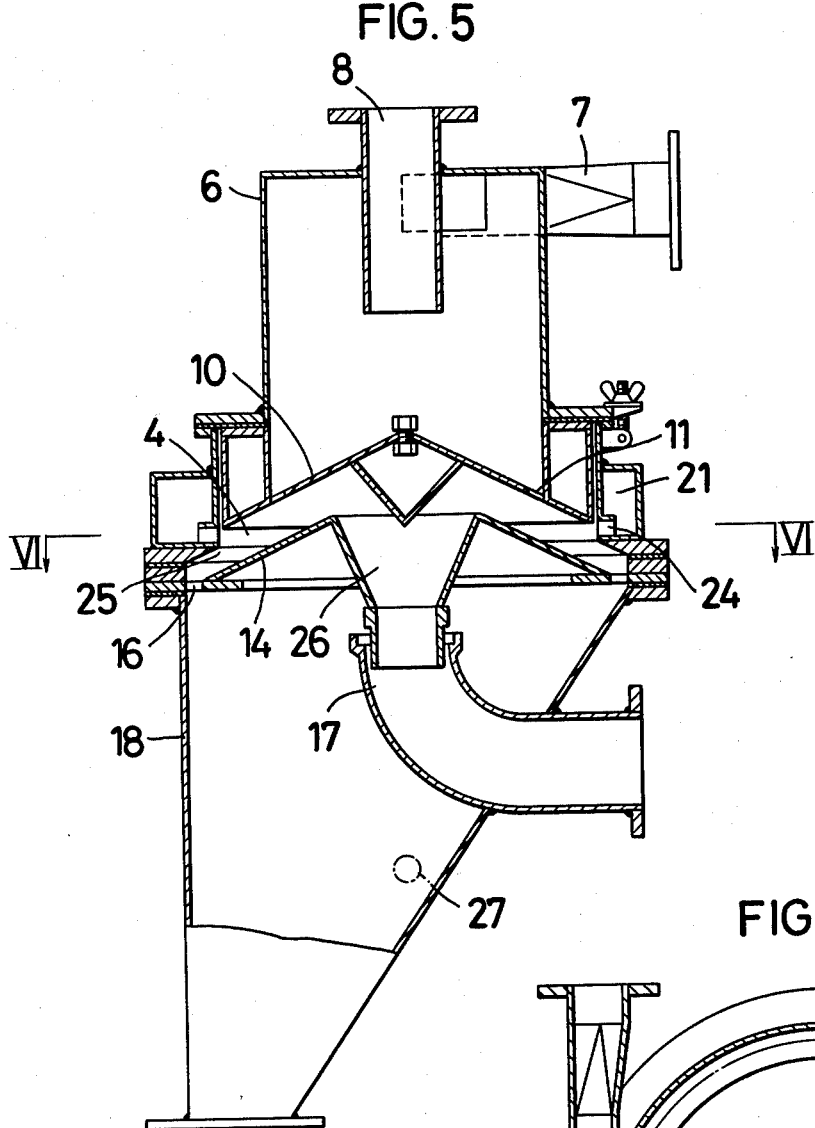
FIG. 5 is a vertical sectional view of the third embodiment in accordance with the present invention.
Figure 6:
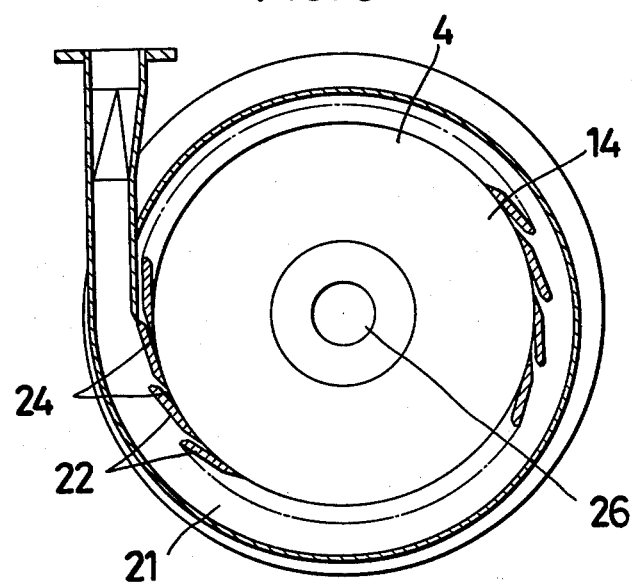
FIG. 6 is a sectional view taken along line VI—VI of FIG. 5.

Referring now to FIG. 5, an air classifier in accordance with the third embodiment includes a classifying chamber 4 and a classifying plate 14 which is provided at the bottom of the classifying chamber 4. The classifying plate 14 is a truncated cone, the circular boundary of its base having a larger diameter than the inside diameter of the classifying chamber 4, the classifying chamber having walls extending parallel to the lower part of the slanting of the classifying plate 14 so that a slanting passage 25 is located adjacent to the lower part of the slanting surface of the classifying plate 14.

A discharge funnel 26 for discharging fine particles is located on the upper edge of the classifying plate 14, and is connected to one end of a discharge pipe 17 which is bent within the casing 18 so that the other end projects through the side wall of the casing 18.

In the course of pneumatic conveying through the feed pipe 7, material is injected into the guide barrel 6 in a direction which is at a tangent to the cylindrical side wall thereof and the material moves down toward the lower end of the guide barrel 6 while moving in a vortex.

The air which is supplied into the guide barrel 6 as a means for pneumatic conveying of the material also moves in a vortex and moves toward the central part of the interior of the guide barrel 6, and spontaneously flows out through the exhaust pipe 8. In the alternative, the air is forcedly evacuated by means of an air exhauster (not shown) which is connected to the exhaust pipe 8. Consequently, the concentration of particles moving in a vortex along the internal surface of the guide barrel 6 increases as the material travels goes down toward the lower end of the guide barrel 6.

In the first embodiment, the material collides with the guide vanes 9 upon moving down to the lower part of the guide barrel 6 so that the constituents of the material are dispersed and the concentration of particles is made uniform.

In the second embodiment, the constituents of the material are efficiently dispersed by the high-pressure air which is injected into the guide barrel 6 through the air injection nozzles 13. In addition, the material is accelerated because the high-pressure air is injected in the same direction as the path of travel of the material moving in a vortex.

Thus, the material traveling in a vortex has a uniform concentration of particles with the various constituents of the material being kept in a sufficiently dispersed state. The material is then admitted into the classifying chamber 4 through the supply opening 11 at a uniform flow rate along the circular edge of the conical guide plate 10, so that the material is efficiently classified in the classifying chamber 4 and as a result a larger quantity of material can be processed per unit time.

The material continues to move in a vortex within the classifying chamber 4, and is further dispersed and accelerated by the circular current of high-pressure air being injected into the classifying chamber 4 through the air injection nozzles 13, as described in connection with the first embodiment, and through the small openings 24 between the slanted fins 22 of the louver as described in the second and third embodiments. Coarse particles are separated from fine ones by centrifugal force and driven to the outer tracks within the classifying chamber 4 and subsequently dropped into the hopper 3 through the discharge opening 16 and discharged. Fine particles move to the central part of the interior of the classifying chamber 4, move over the upper edge of the classifying plate 14 and are discharged through the discharge pipe 17.

The capacity of the classifying chamber 4 can be made adjustable by having a conical guide plate 10 capable of vertical adjustment.

The slanting passage 25 permits the air classifier to rely not only on gravity but also on centrifugal force for discharging coarse particles from within the classifying chamber 4.

Fine particles mixed with coarse ones and those falling through the discharge opening 16 are returned to the classifying chamber 4 through the discharge opening 16 by means of a spirally ascending current of air which is supplied through an air supply port 27 located in the lower part of the side wall of the casing 18.

The upper end portion of the discharge pipe 17 projects slightly upward in the classifying chamber 4 as described in connection with in the second embodiment and serves to prevent unclassified material from flowing directly into the discharge pipe 17.

The size of fine particles to be obtained can be adjusted by replacing the discharge pipe 17 with one having a different interior diameter or by adjusting the diameter of the inlet port of the discharge pipe 17.

A high concentration of particles in the classifying chamber 4 and only a small quantity of air mixed with the material, together with air from the ring-shaped high-pressure air chamber 12 being injected into the classifying chamber 4 in the same direction as the path of travel of the material moving in a vortex, cause the particles in the classifying chamber 4 to undergo large centrifugal acceleration and to move in a vortex and have a comparatively small centripetal component of velocity thereby permitting discharge of extremely fine particles through the discharge pipe 17.

Figure 7:
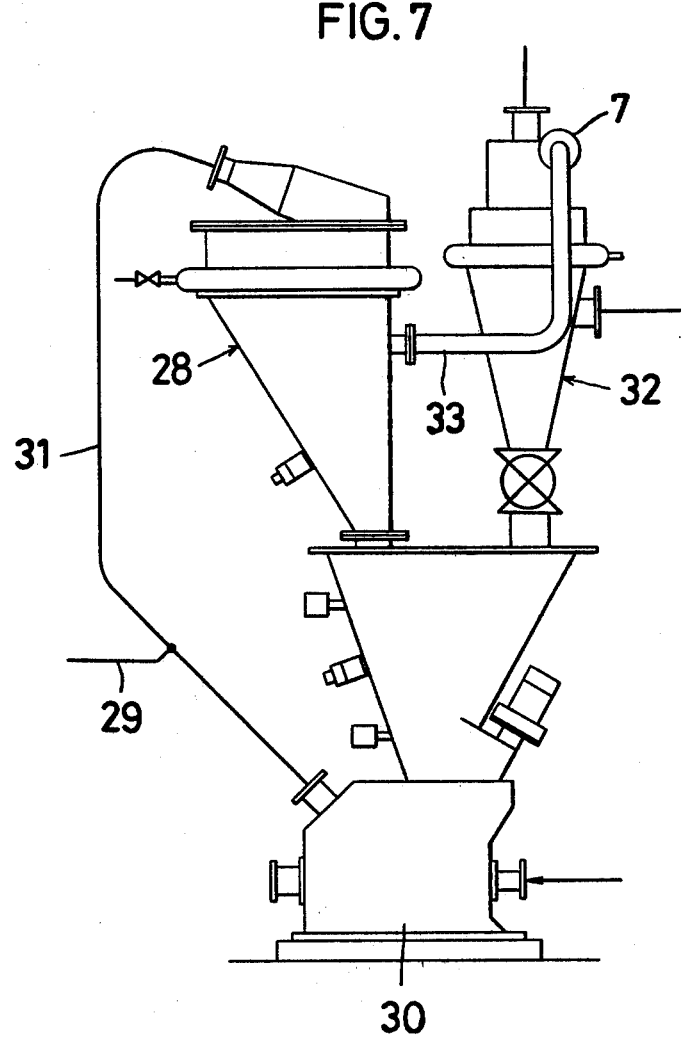
FIG. 7 is a schematic diagram of the system used in a manufacturing process.

Referring now to FIG. 7, material is fed into a primary classifier 28 through pipe lines 29 and 31. Coarse particles are separated from fine ones, dropped into a pulverizer 30 and pulverized therein, discharged therefrom and fed again to the primary classifier 28 through the pipe line 31. Fine particles discharged from the primary classifier 28 are fed to a secondary classifier 32 through a pipe 33 and the feed pipe 7 and are therein further classified in the secondary classifier 32, discharged therefrom, and fed to a cyclone, etc.

The air classifier of the present invention is suited especially for use as the secondary classifier 32 in the above-described two-stage classification device, a device which is highly desirable for improving the accuracy of classification.

While we have disclosed several embodiments of the present invention, it is to be understood that they have been described by way of examples only, various other modifications being obvious to those skilled in the art, the scope of the present invention herein being determined by the objects and the claims.

What I claim is:

1. An air classifier for separating a stream of particles suspended in a gas stream into coarse and fine particles, said air classifier comprising:
    (a) a guide barrel having an axis extending vertically, said guide barrel being closed at its top and having a cylindrical side wall;
    (b) an exhaust pipe attached to and vertically extending along said axis of and through said closed top of said guide barrel for exhausting fine particles;
    (c) feed pipe means attached to said cylindrical side wall of said barrel at a tangent for feeding particles in a gas stream into said guide barrel and causing said particles to move in a vortex within said guide barrel;
    (d) a classifying chamber having a cylindrical side wall and coaxial with said guide barrel below said guide barrel, said classifying chamber having a plurality of regularly spaced small openings on said cylindrical side wall;
    (e) a conical guide plate having an upwardly directed vertex, said conical guide plate positioned between said classifying chamber and said guide barrel and coaxial with said guide barrel, the outside diameter of said guide plate being smaller than the inside diameters of said guide barrel and classifying chamber and defining a ring shaped supply opening between the lower edge of said guide barrel and the circular edge of said conical guide plate;
    (f) a ring-shaped high-pressure air chamber attached to said classifying chamber around the periphery of said classifying chamber, said air chamber having a plurality of small openings which are coextensive with said classifying chamber openings for injecting high pressure air into said classifying chamber for causing said stream of particles to separate into coarse and fine particles as said stream of particles drop through said classifying chamber by causing said particles to accelerate while moving in said vortex;
    (g) a truncated cone having an upwardly directed truncated portion, said truncated cone located at the bottom of said classifying chamber and having the lower edge spaced from said classifying chamber for defining a ring shaped discharge opening for discharging coarse particles; and
    (h) a discharge pipe connected to said truncated cone-shaped classifying plate, extending down through said classifying plate for discharging fine particles.

2. An air classifier as set forth in claim 1, wherein said feed pipe means causes material entering said classifying chamber to move in a vortex within said classifying chamber and said classifying chamber has a plurality of regularly spaced air injection nozzles which are aimed in the direction of travel of said material moving in a vortex.

3. An air classifier as set forth in claim 1, further comprising curved fins attached to said cylindrical side wall of said classifying chamber, said curved fins having an arc such that the ends of said fins are perpendicular to the direction of travel of said material moving in a vortex for causing the constituents of said material to disperse.

4. An air classifier as set forth in claim 1, wherein said discharge pipe is engaged by and supported by said truncated cone-shaped classifying plate with the upper end portion of said discharge pipe projecting slightly into said classifying chamber.

5. An air classifier as set forth in claim 4, wherein said upper end portion of said discharge pipe has a flange extending outward in a perpendicular direction therefrom.

6. An air classifier as set forth in claim 1, wherein said ring-shaped high-pressure air chamber is vortex shaped and has a sectional area which decreases along and in the direction of the terminal portion at the center of said vortex shaped chamber.

7. An air classifier as set forth in claim 1, wherein the base of said classifying plate is of a greater diameter than the interior diameter of said classifying chamber, said classifying chamber having slanting walls which extend at an angle parallel to the lower part of the slanting surface of said classifying plate for defining a slanting passage between said classifying plate and said slanting walls.

* * * * *